(12) United States Patent
Baker

(10) Patent No.: US 9,801,361 B2
(45) Date of Patent: Oct. 31, 2017

(54) SYSTEM AND METHOD FOR MAINTAINING THE HEALTH OF CAPTIVE FISH IN A MOBILE ENVIRONMENT

(71) Applicant: Donald J Baker, Poulsbo, WA (US)

(72) Inventor: Donald J Baker, Poulsbo, WA (US)

( * ) Notice: Subject to any disclaimer, the term of this patent is extended or adjusted under 35 U.S.C. 154(b) by 36 days.

(21) Appl. No.: 14/289,578

(22) Filed: May 28, 2014

(65) Prior Publication Data

US 2014/0352198 A1 Dec. 4, 2014

Related U.S. Application Data

(60) Provisional application No. 61/828,080, filed on May 28, 2013.

(51) Int. Cl.
*A01K 63/02* (2006.01)
*A01K 97/05* (2006.01)

(52) U.S. Cl.
CPC .............. *A01K 63/02* (2013.01); *A01K 97/05* (2013.01)

(58) Field of Classification Search
CPC ........ A01K 63/02; A01K 63/04; A01K 63/06; A01K 63/065; A01K 97/04; A01K 97/05; A01K 97/20
USPC ..... 43/54.1, 55–57; 119/228, 229, 245, 262; 224/920; 206/315.11
IPC .................... A01K 63/02,63/064, 63/06, 97/04, A01K 97/05, 97/20
See application file for complete search history.

(56) References Cited

U.S. PATENT DOCUMENTS

| | | | | |
|---|---|---|---|---|
| 2,721,718 A * | 10/1955 | Wagner | ................ | A01K 97/05 248/214 |
| 2,974,437 A * | 3/1961 | Stadler | .................... | A01K 97/05 43/55 |
| 4,124,793 A * | 11/1978 | Colman | ............... | A01K 63/065 219/494 |
| 4,198,776 A * | 4/1980 | Tomita | .................. | A01K 97/05 43/56 |
| 4,748,765 A * | 6/1988 | Martin | .................. | A01K 97/20 43/55 |
| 4,766,691 A * | 8/1988 | Lynn | ..................... | A01K 97/05 43/55 |
| 5,172,511 A * | 12/1992 | Smith | .................... | A01K 97/05 261/121.2 |
| 5,299,424 A * | 4/1994 | Woodson | ............. | A01K 63/065 119/229 |
| 6,962,019 B1 * | 11/2005 | McDougle | ........... | A01K 63/045 119/226 |
| 7,134,293 B2 * | 11/2006 | Rabal | .................... | A01K 63/02 62/185 |
| 2003/0033746 A1 * | 2/2003 | Johnson | ................ | A01K 97/05 43/55 |
| 2005/0204610 A1 * | 9/2005 | Bogart | ................... | A01K 97/20 43/55 |

(Continued)

*Primary Examiner* — Lisa Tsang
(74) *Attorney, Agent, or Firm* — Galvin Patent Law LLC; Brian R. Galvin

(57) ABSTRACT

A system for maintaining the health of captive fish in a mobile environment, comprising a live well for containing fish in a fluid medium, a plurality of thermoelectric coolers affixed to the live well, and a thermometric rheostat for controlling a direct current applied to the thermoelectric coolers, and a method for maintaining a consistent temperature comprising the steps of setting an initial temperature, applying a current to thermoelectric coolers, reading a new temperature, and adjusting the current based at least in part on the new temperature reading.

9 Claims, 4 Drawing Sheets

(56) References Cited

U.S. PATENT DOCUMENTS

2005/0268527 A1* 12/2005 Beech .................... A01K 97/05
                                                                                               43/55

\* cited by examiner

SYSTEM AND METHOD FOR MAINTAINING THE HEALTH OF CAPTIVE FISH IN A MOBILE ENVIRONMENT

CROSS-REFERENCE TO RELATED APPLICATIONS

This application claims priority to U.S. provisional patent application Ser. No. 61/828,080, titled "METHOD AND APPARATUS FOR HEALTHY CONTAINMENT OF LIVE FISH", which was filed on May 28, 2013, the entire specification of which is incorporated herein by reference.

BACKGROUND OF THE INVENTION

Field of the Art

The disclosure relates to the field of fishing equipment, and more particularly to the field of maintaining the health of live fish in a captive, mobile environment.

Discussion of the State of the Art

The sport of fishing involves a number of technologies designed to keep fish healthy until needed. In most cases, the equipment utilized for live bait is often the same equipment utilized for the holding of caught fish though the actual containment areas will be separated from one another.

The technology in use today for preserving the health of fish while fishing commonly involves the use of a tank or live well of some sort through which water is re-circulated, the temperature is modulated as necessary and oxygenation of the water occurs through the introduction of fresh water or aeration of the tank water. All three of these things (water temperature, oxygenation and water cleanliness), work together to help keep the contained fish healthy.

Re-circulation of water through the live well helps to maintain the proper level of oxygen. Water being returned to the live well via the re-circulation pump is gently sprayed into the tank thus allowing the returning water to absorb oxygen prior to landing in the live well. This re-circulation process also brings about the need for temperature modulation.

Water in any kind of live well will change temperature through simple absorption of the heat or cold in the environment. Aeration of the re-circulated water being returned to the live well will lower the temperature of the water. The ideal design of a live well is for the water temp in the tank to match as closely as possible, the water temperature in the fish's natural habitat. Re-circulating the live well water provides the opportunity to expose the water to chilled pipes or warmed pipes and is frequently the method of varying the temperature of the water.

Thus we have a system in which all three requirements must be a part of any live well for fish. The challenge is finding a way to deliver each of the three requirements in which meeting any one of the requirements has a minimum impact on the other two requirements.

Today, the common method for varying the temperature of the water in the live well is to introduce cooler water from melting ice. While this does indeed lower the water temperature, the amount of ice needed for a full day of fishing on a lake is more than most boats can carry thus fishing boats must return to the docks to replenish ice stores on a regular basis. The round trip from the fishing spot to the docks and back costs a significant amount of money in terms of fishing time lost, gas to transit back and forth and increased boat weight.

The issue of oxygenation of the live well's water is often addressed through the frequency of water circulation. The most common method of oxygenation of the water is to spray the water back into the live well. Spraying has no mechanical parts beyond the circulation pump and is not prone to failure. Spraying does alter the water temperature and depending upon the difference between the ambient air and the desired temperature of the water, additional water cooling may be needed to counter the effects of heat being absorbed by the water from the ambient air. The common method for addressing the rising temperature of the water in the live well is to add ice water to the tank. As described earlier, using ice to cool the water only works when you have ice available.

There are a variety of ways in which these three requirements have been addressed. For example, the use of a radiator through which the water in the live well is passed in order to lower the temperature. While this approach has merit, it relies on filtered water to prevent the clogging of the tiny capillaries located in the radiator. Lake water and organic fish material are likely to bring about such a clogging of the radiator over time. In addition, a radiator is good for cooling but has no ability to heat water should that be necessary.

A similar problem is found when looking at approaches involving a recirculating water system that combines aeration along with cooling to help create a healthful tank environment. This approach also has merit but relies heavily on a tank of ice in order to have cooled coils over which the tank water can pass in order to be cooled. This brings the general problem of ice consumption into the picture thus solving the temperature problem but not addressing the ice problem.

What is needed is a means of addressing all three of the requirements without the use of ice, without mechanical circulation systems that can clog and without having wide swings in water temperature that affect the health of the fish. Such a system ought to be able to be delivered in a variety of forms including being fitted into existing holding tanks in boats, incorporated into new holding tanks in boats and as a stand-alone holding tank that has no reliance on a boat's fittings.

SUMMARY OF THE INVENTION

Accordingly, the inventor has conceived and reduced to practice, in a preferred embodiment of the invention, a system and method for maintaining the health of fish in a mobile captive environment (such as a fishing vessel), without the use of ice or the risks of clogging, and that may be used to maintain an ideal temperature with minimal fluctuation.

According to a preferred embodiment of the invention, a system for healthy containment of live fish comprising a live well for containing live fish in a fluid medium (such as lake water from the habitat where the fish were found), a plurality of thermoelectric coolers connected to a direct current (DC) source (such as a battery, generator, or other suitable source of direct electric current), and a thermostatically-controlled rheostat that may automatically vary current to the thermoelectric coolers according to a predefined or configurable setting, is disclosed. According to the embodiment, a plurality of thermoelectric coolers may be placed in the fluid medium containing live fish, and a rheostat may be used such that a user (i.e., a fisherman) may select a desired temperature or range and the rheostat will automatically vary the current flow to the thermoelectric coolers based on thermostat feedback from the fluid medium, such that a consistent temperature is maintained automatically.

This invention introduces the technology of thermoelectric coolers to the fishing industry. Thermoelectric coolers utilize the Peltier Effect to create a heat pump. The thermoelectric cooler utilizes a DC current to cause electrons to flow between a heat source and a heat sink. The direction of the current flow determines which side of the thermoelectric cooler will act as heat sink (i.e., extracts heat from its surface environment), and which side will act as heat source (i.e., inject heat into its surface environment). That is, reversal of polarity will cause heat to flow in the opposite direction. Thus we have cooling side and a heating side whose positions can be reversed through a change of direction of the DC current.

The thermoelectric cooler can also vary the temperature of the heat source and heat sink through varying the strength of the voltage being used. The stronger the current, the higher the temperature differential between the two sides of the thermoelectric cooler.

Through the introduction of thermoelectric coolers to the live well, the temperature of the water in the tank can be varied by changes to the direction of current and strength of current flowing through the thermoelectric cooler.

As the thermoelectric cooler has no moving parts and no tubes, there is no possibility of clogging or damage from the circulating water. As live wells are made in differing sizes, the number of thermoelectric coolers introduced to a given tank can be matched to the water volume and speed with which temperature changes are desired.

Introduction of a thermostatically-controlled rheostat along with the thermoelectric cooler would allow the fisherman to select the desired temperature of the holding tank and let the rheostat vary the current going to the thermoelectric cooler in order to vary the water temperature.

Utilizing thermoelectric coolers in the holding tank eliminates the need for ice and the cost of replenishment that it brings. The thermoelectric coolers also address the need for a system that has as few moving parts as possible. Moving parts break. Thermoelectric coolers have no moving parts thus there is nothing to break down during use. Lastly, the small amount of electrical current needed to power the thermoelectric coolers can be supplied by batteries; themselves recharged via solar panels or other recharging methods if necessary.

In another embodiment of the invention, an additional thermostat may be utilized that is placed in surrounding lake water (i.e., outside of a fishing vessel or on the exterior of the hull below the waterline so it remains submerged), such that no manual input is needed and the rheostat uses the external thermostat as feedback to control the temperature of the fluid medium in the live well, such that the temperature consistently matches that of the surrounding lake (i.e., the natural habitat of the fish in containment, which it may be reasonably assumed is an ideal environment to maintain their health).

In another preferred embodiment of the invention, a method for maintaining the health of live fish in containment, comprising the steps of selecting a temperature setting, optionally retrieving an initial temperature setting from a thermostat, applying a direct current to a thermoelectric cooler, receiving thermostat feedback on the results of the cooler operation, and adjusting the current based at least in part on the feedback, is disclosed. According to the embodiment, operation may continue in a looping fashion such that the current is continuously manipulated to maintain temperature based on feedback from a plurality of thermostats, and an initial setting may be either manually input by a user or retrieved from a thermostat (such as a thermostat placed on the outside of a vessel), interchangeably.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
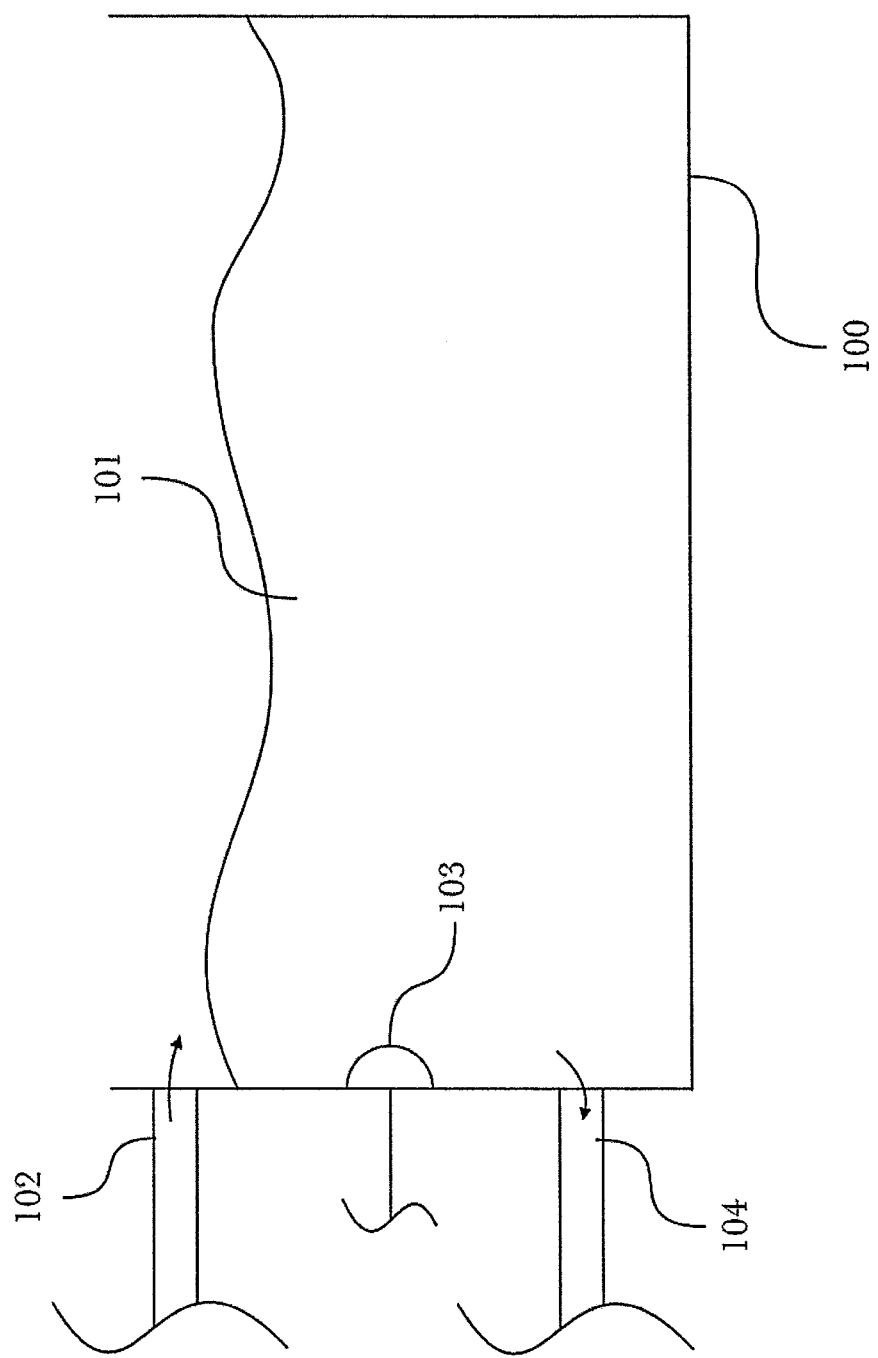
FIG. 1 is a side-view illustration of a live well.

The inventor has conceived, and reduced to practice, a system and method for maintaining the health of captive fish in a mobile environment.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

FIG. 1 is a side-view illustration of a live well 100. The live well 100 is a tank in which fish may be placed. Its size and shape will reflect the installation location be it fishing vessel or portable (such as hand-carried) form.

The live well may be filled with water 101 that may be treated to match the fish's natural habitat, salt water or fresh water. A hose may be connected to the live well 104 to allow water to be drawn from the live well and sent through a heat exchanger (as illustrated below, referring to FIG. 2) before being returned to the tank via the return feed hose 102. The temperature of the water in the live well may be continually measured by a temperature sensor 103.

Figure 2:
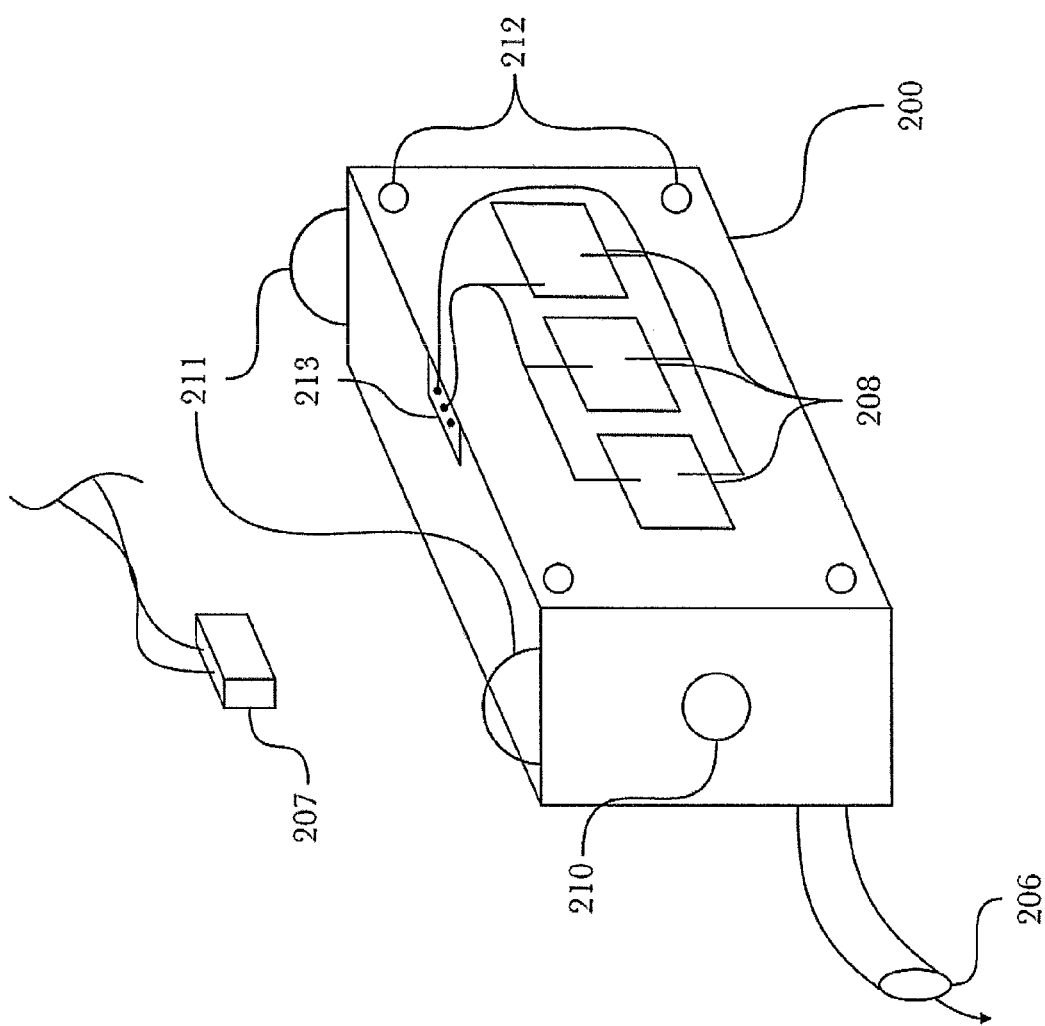
FIG. 2 is a front view illustration of a heat exchanger tank with multiple thermoelectric coolers installed in the walls of the tank.

FIG. 2 is a front view illustration of a heat exchanger tank 200 with multiple thermoelectric coolers installed in the walls of the tank. The heat exchanger 200 may receive water drawn from a live well 100 through an input tube 205. This water passes through the heat exchanger and may be returned to the live well 100 via the output tube 206.

Water flowing through the heat exchanger 200 may pass over a plurality of thermoelectric coolers 208. The size of the live well and the temperature difference between the live well and the ambient temperature may determine how many thermoelectric coolers will be installed into the heat exchanger. The thermoelectric coolers 208 may be electrically connected to a power cable 207 through which DC current is supplied from a source (such as a battery, engine, generator, or other appropriate source of direct electrical current). Varying the polarity (that is, the direction in which a current flows) of the DC current along with the voltage and amperage may allow the thermoelectric coolers to warm or cool the water as it passes by. The external sides of the thermoelectric coolers 108 may be exposed to body of water where fishing is occurring. The allows the large body of water to act as a heat sink for one side of the thermoelectric coolers, drawing heat away from the live well and fish within. The temperature of the water flowing out of the heat exchanger may be continually measured by a temperature sensor 210 located within the heat exchanger.

Monitoring the temperature of the water exiting the heat exchanger during re-circulation allows for various rates of temperature change in the live well. Small differences between the temperature in the live well versus the heat exchanger temperature would bring about a very gradual change in the live well water temperature. Larger differences would bring about more rapid changes in the live well water temperature. Various embodiments of manual override options to the thermoelectric rheostat would provide the flexibility to introduce personal preferences into the live well temperature management process.

The heat exchanger may be suspended from a fishing boat via mounting loops 211 or similar means of mounting or suspension. A plurality of bumpers 212 may be installed on the outside of the heat exchanger in order to ensure a sufficient gap exists between the heat exchanger 200 and the side of a fishing boat where the heat exchanger is suspended.

The electrical current used to operate the thermoelectric coolers and the wire carrying the temperature information from the temperature sensor 210 may be brought together at a termination point 213. This termination point should ideally be watertight, thus the connection will be sealed prior to initial usage.

Figure 3:
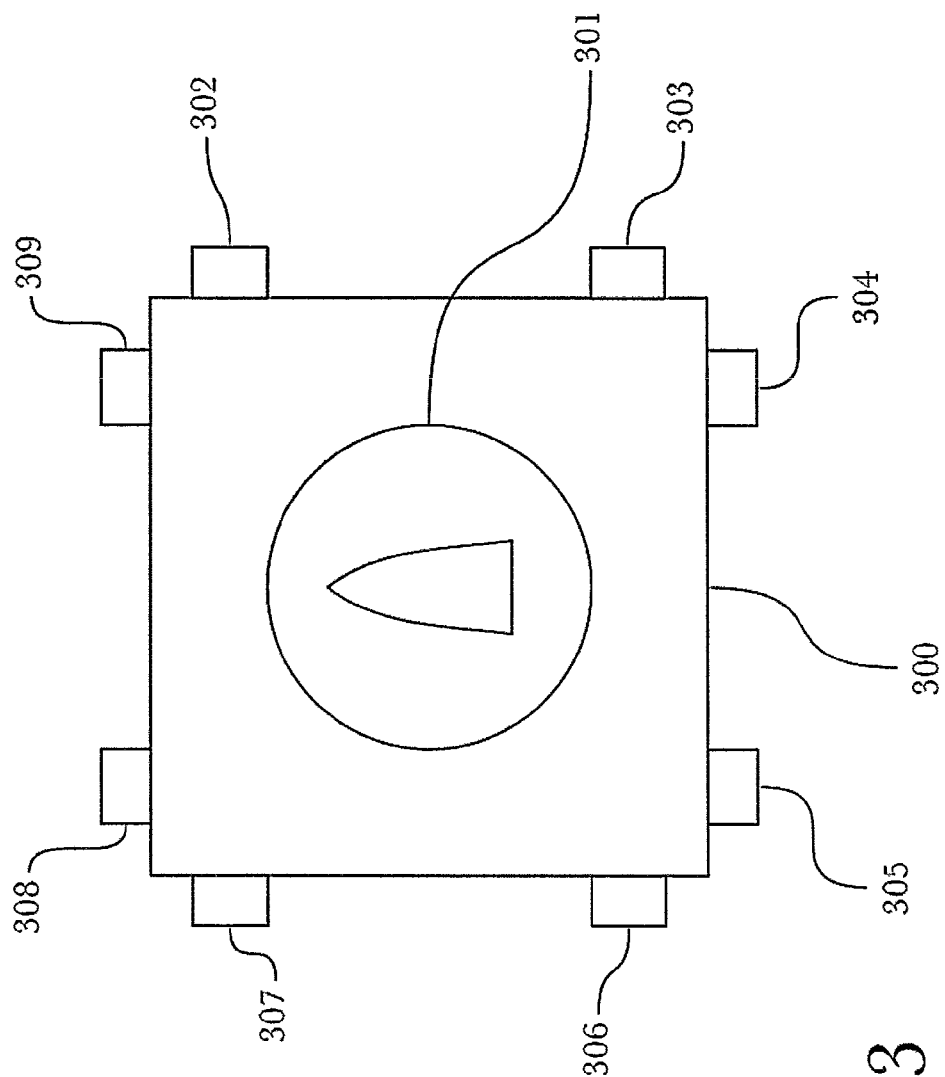
FIG. 3 is a depiction of the thermometric rheostat that monitors the water temperature in the live well and varies the water temperature via control of the current going to the thermoelectric coolers and the speed of the re-circulation pumps.

FIG. 3 is a depiction of a thermometric rheostat 300 that may monitor the water temperature in a live well 100 and may vary the water temperature via control of a current going to thermoelectric coolers 108 and may also vary the speed of re-circulation pumps (not shown). The temperature sensor 103 from a live well and the temperature sensor 210 from the heat exchanger may be connected to a thermometric rheostat 300 using connectors 308 & 309. The purpose of the thermoelectric rheostat may be to evaluate the temperature of the water in the live well and activate the re-circulation pumps and the heat exchanger to raise or lower the water temperature appropriately. The DC current may enter the thermoelectric rheostat at the positive and negative connectors 302 and 303. A re-circulation pump may be connected to terminals 304 & 305. The thermoelectric coolers may connect to the rheostat via terminals 307 & 306. A dial 301 on the front of the thermometric rheostat 300 may be used to set the desired temperature of the live well water manually if desired.

In normal operation, a temperature sensor 103 may provide signaling to a thermostatically controlled rheostat 300 indicating the current temperature in a live well 100. The rheostat 300 may interpret the signaling and determine the difference between the live well temperature and a target temperature. If it is determined that the water in the live well needs to be heated, a direct current of the appropriate polarity may be sent to thermoelectric coolers 208 and a circulation pump may be engaged. When the target temperature in the live well has been reached, the power may be shut off to both the re-circulation pump and the thermoelectric coolers. If the water in the live well needs to be cooled, the same process occurs with the exception that the polarity of the direct current going to the thermoelectric coolers 208 will be reversed, such that heat flows in the opposite direction (from the exterior environment into the live well, rather than drawn away from the live well and dissipated).

It may also be possible to set the thermoelectric rheostat to continually run the re-circulation pumps and only activate the thermoelectric coolers as the temperature sensors indicate a need, thus maintaining a continuous flow or circulation of water as may be desirable, while maintaining a consistent temperature rather than heating or cooling simultaneously to the circulation operation.

Detailed Description of Exemplary Embodiments

Figure 4:
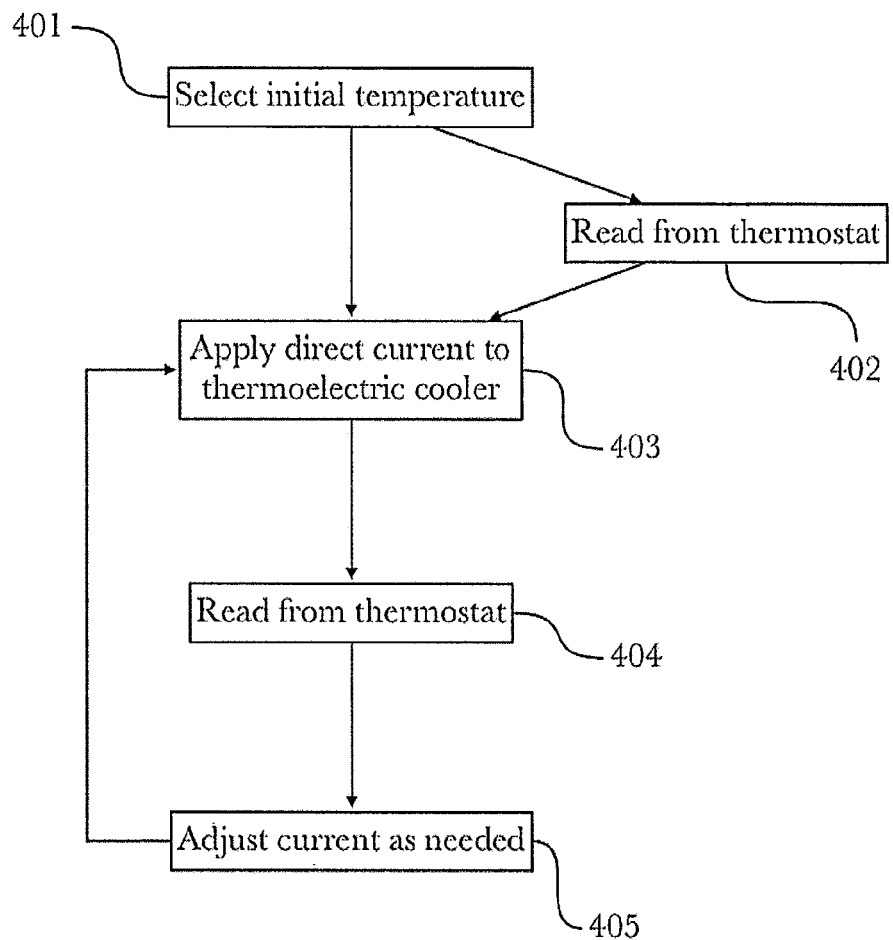
FIG. 4 is a method flow diagram illustrating an exemplary method for maintaining the health of captive fish in a mobile environment, according to a preferred embodiment of the invention.

FIG. 4 is a method flow diagram illustrating an exemplary method for maintaining the health of captive fish in a mobile environment, according to a preferred embodiment of the invention. In an initial step 401, a temperature setting may be selected either manually such as by setting a dial or digital temperature selector, or automatically such as by optionally retrieving an initial temperature setting from a thermostat in an optional step 402. In a next step 403 a direct current may be applied to a thermoelectric cooler, such as a Peltier module. In a next step 404, feedback may be received from a thermostat such as to report on the results of the thermoelectric cooler operation (i.e., to indicate a temperature increase or decrease according to the operation mode of the cooler). In a final step 405, the current may then be adjusted (such as by varying the voltage or amperage, or reversing the current flow or polarity) based at least in part on the feedback, such as to alter the temperature further in an intelligent manner. According to the embodiment, operation may continue in a looping fashion such that the current is continuously manipulated to maintain temperature based on feedback from a plurality of thermostats, and an initial setting may be either manually input by a user or retrieved from a thermostat (such as a thermostat placed on the outside of a vessel), interchangeably.

The skilled person will be aware of a range of possible modifications of the various embodiments described above. Accordingly, the present invention is defined by the claims and their equivalents.

What is claimed is:

1. A system for maintaining the health of captive fish in a mobile environment, comprising:
   a live well;
   a fluid medium;
   a plurality of thermoelectric coolers; and
   a thermometric rheostat;
   wherein the live well is a container that holds the fluid medium;
   wherein the thermoelectric coolers are integrally formed within an outer wall of a heat exchanger comprising an internal volume of rectangular cross section, and water from the live well passes through the interior volume of the heat exchanger;
   wherein the thermoelectric coolers receive a direct electric current;
   wherein the heat exchanger is suspended from an external surface of a boat by mounting loops affixed to the boat and exposed thereby to a body of water within which the boat operates such that the integrally-formed thermoelectric coolers are in contact with the body of water and directly exposed thereby to the body of water on a first side while being exposed to water from the live well on an opposite second side, the heat exchanger further comprising bumpers on an external surface thereof that maintain separation between the heat exchanger and the external surface of the boat, while allowing both sides of the heat exchanger to be in direct contact with the body of water in which the heat exchanger is suspended and the boat is operating; and
   wherein the thermometric rheostat controls the direct electric current that is applied to the thermoelectric coolers, thereby controlling water temperature in the live well by causing the thermoelectric coolers to either remove heat from or add heat to the water from the live well that passes through the interior volume of the heat exchanger, while also removing heat from or adding heat to the body of water.

2. The system of claim 1, further comprising an internal thermometer, wherein the internal thermometer reads the temperature of the fluid medium within the live well.

3. The system of claim 2, wherein the thermometric rheostat alters the direct electric current based at least in part on the internal thermometer reading.

4. The system of claim 2, further comprising an external thermometer, wherein the external thermometer reads the temperature of an environment external to the live well.

5. The system of claim 4, wherein the thermometric rheostat alters the direct electric current based at least in part on an external thermometer reading.

6. The system of claim 4, wherein the environment external to the live well is a body of water.

7. A method for maintaining a consistent temperature for the health of captive fish, comprising the steps of:
   setting, on a thermometric rheostat, an initial target temperature of a live well;
   applying a direct current to a plurality of thermoelectric coolers;
   reading, using a thermometer, a fluid temperature; and
   adjusting, using the thermometric rheostat, the direct current based at least in part on the fluid temperature, thereby controlling water temperature in the live well by causing the thermoelectric coolers to either remove heat from or add heat to the water from the live well that passes through an interior volume of a heat exchanger, while also removing heat from or adding heat to a body of water;
   wherein the thermoelectric coolers are integrally formed within an outer wall of the heat exchanger comprising an internal volume of rectangular cross section, and water from the live well passes through the interior volume of the heat exchanger;

wherein the thermoelectric coolers receive a direct electric current; and wherein the heat exchanger is suspended from an external surface of a boat by mounting loops affixed to the boat and exposed thereby to the body of water within which the boat operates such that the integrally-formed thermoelectric coolers are in contact with the body of water and directly exposed thereby to the body of water on a first side while being exposed to the water from the live well on an opposite second side, the heat exchanger further comprising bumpers on an external surface thereof that maintain separation between the heat exchanger and the external surface of the boat while allowing both sides of the heat exchanger to be in direct contact with the body of water in which the heat exchanger is suspended and the boat is operating.

8. The method of claim 7, further comprising the step of:

taking an initial reading, using the thermometer, of the fluid temperature.

9. The method of claim 8, wherein the initial target temperature is based at least in part on the initial reading.

* * * * *